United States Patent [19]

Naito et al.

[11] Patent Number: 5,021,894

[45] Date of Patent: Jun. 4, 1991

[54] RECORDED DATA DEMODULATION CIRCUIT

[75] Inventors: Ryuichi Naito; Keiji Kinpara, both of Saitama, Japan

[73] Assignee: Pioneer Electronic Corporation, Tokyo, Japan

[21] Appl. No.: 459,419

[22] Filed: Jan. 2, 1990

[30] Foreign Application Priority Data

May 30, 1989 [JP] Japan .................................. 1-136596

[51] Int. Cl.$^5$ ........................... G11B 5/09; G11B 5/00
[52] U.S. Cl. ........................................ 360/46; 360/32; 360/51
[58] Field of Search ........................ 360/46, 65, 29, 41, 360/32, 51, 49; 369/59, 60

[56] References Cited

U.S. PATENT DOCUMENTS 4,675,749 6/1987 Banno et al. .......................... 369/59
4,758,903 7/1988 Noguchi et al. ...................... 360/65

Primary Examiner—Vincent P. Canney
Assistant Examiner—Varsha V. Sheladia
Attorney, Agent, or Firm—Sughrue, Mion, Zinn, Macpeak & Seas

[57] ABSTRACT

A clock of a predetermined frequency is generated on a basis of clock information contained in a read signal. Sample values obtained by sampling the read signal in response to the clock are sequentially converted into digital data, and the thus obtained digital data are held in a first data holding means and then second data holding means in response to the clock for a time corresponding to the clock. The digital data and the output data from the second data holding means are added, and the addition output bits are multiplied by a predetermined constant by inserting a selected number of zero bits as upper significant bits, and shifting the addition output bits by the selected number of zero bits. Data corresponding to the difference between the multiplied output and the output of the first data holding means is obtained, and the thus obtained difference output is demodulated in response to the clock.

2 Claims, 4 Drawing Sheets

RECORDED DATA DEMODULATION CIRCUIT

FIELD OF THE INVENTION

The present invention relates to a circuit for demodulating data recorded on a recording medium such as an optical disk or the like.

BACKGROUND OF THE INVENTION

Recently, read-only optical disks and write-once type optical disks have been put into practice, and rewritable optical disks are also going to be put into practice. In any of these optical disks, a track pitch is typically very narrow at about 1-2 μm, and therefore concave or convex pits or grooves for performing track tracking are formed in each disk in advance. The relative positional relationship between a track and an information reading beam spot in the radial direction of the disk can be detected on the basis of diffraction of light radiated onto and reflected from the disk by means of the pits or grooves, whereby it is possible to form a tracking servo for making the beam spot follow the track. Further, the pits can be used as information to support ancillary tasks, i.e., for generating a clock required for recording-/reproducing data, information for dividing a track into sectors, information for providing access to a sector, information for dividing the inside of a sector into blocks, and the like, and the various information is read by diffraction of light due to the pits. Such pits formed in the disk in advance for the purpose of obtaining information by using diffraction of light as described above are called embossed pits.

FIGS. 3 to 5 show an example of the arrangement of embossed pits (a so-called format) in a disk.

In the format shown in FIGS. 3 to 5, a track formed virtually spirally in the disk is divided into 1376 equiangular segments for every revolution. Further, 43 successive segments constitute a sector so that a full revolution of a track is constituted by 32 sectors.

FIG. 3 shows the segment configuration of each sector. Each segment is constituted by 18 bytes in which 2 bytes constitute a servo area and 16 bytes constitute a header area or a data area. The first segment has a header area of 16 bytes, and each of the second to forty-third segments has a data area of 16 bytes. Each of the bytes constituting the servo area, the header area, and the data area is divided into 15 channel bits.

FIG. 4 is a diagram showing the configuration of the servo area. The servo area in each segment is constituted by 2 bytes. The bytes constituting the servo area are called first and second servo bytes respectively. Two embossed bits are formed in the first servo byte. The embossed bits are formed in positions each radially displaced (i.e., wobbled) from the virtual track center by about a ¼ track pitch in opposite directions with respect to each other.

The first wobbled pit PW1 is formed at a selected one of the positions of the third and fourth channel bits while the positions are alternatively changed over for every 16 tracks, and the second wobbled pit PW2 is formed at the position of the eighth channel bit. A tracking error signal can be generated once for every segment by means of the two wobbled pits in a sampling manner. That is, since a beam spot passes a middle position between the two wobbled pits when it passes the virtual track center, the degrees of diffraction in the respective wobbled pits are equal to each other and the respective intensities of reflected light thereat are equal to each other. As a result, a tracking error signal formed on the basis of a difference between signals obtained by photoelectrically converting the respective intensities of reflection light is zero (indicating no error). If the beam spot passes a position displaced from the virtual track center, on the contrary, a difference is generated between the respective intensities of reflected light from the two wobbled pits so that a tracking error signal corresponding to the direction and quantity of the displacement is obtained. Since 1376 segments exist in one revolution, the tracking error signals obtained in a sampling manner in the servo bytes are substantially equivalent to those obtained continuously, thereby making it possible to perform tracking servo.

Further, in the second servo byte, one embossed pit is formed just at the virtual track center in the position of the twelfth channel bit. This embossed pit is called a clock pit PC. Since one clock pit PC is formed every segment at a fixed position in the servo bytes therein, it is possible to generate a clock having a frequency equal to the channel bit rate by synchronizing a PLL with signals reproduced at predetermined intervals. Modulation is performed on the basis of this clock at the time of data recording, while demodulation is performed also on the basis of this clock at the time of data reproducing.

Since a mirror surface is provided between PW2 and the PC, it is possible to generate a stable focus error signal in a sampling manner without being affected by the existence of the pits.

Further, since the interval between the PW2 and the PC is selected to be a value (19 channel bits) which cannot appear in a 4/15 modulation system described later, it is possible to perform segment synchronization by detecting the interval.

FIG. 5 shows the configuration of the header area. In the first byte, synchronizing marks are formed by means of embossed pits. That is, to form the synchronizing marks, the embossed pits are formed in the second, seventh, eighth, and ninth channel bits, resulting in a peculiar pattern which does not correspond to any NRZ data in a conversion table of the 4/15 modulation system which will be described later. Thus, it is possible to perform sector synchronization by detecting this pattern. In the second byte, a sector address in each track is formed by embossed pits. In the third to seventh bytes, a track address in the disk is formed by embossed pits. The addresses are modulated for every byte in accordance with the 4/15 modulation system which will be described later. The eighth to thirteenth bytes form a reserve area for a non-determined use, the reserve area being formed by a mirror surface having no embossed pits. The fourteenth to sixteenth bytes form a laser power control area which is formed by a mirror surface initially having no embossed pits. Although it is desirable to use suitable light power in the case of performing recording/erasing on a disk, it is permissible in this area that recording/erasing power is experimentally emitted from an optical pickup so that emission power is corrected on the basis of experimental power emission.

Further, the data area has a length of 16 bytes and is formed by a mirror surface having no embossed pits in a non-recorded state. NRZ data are modulated for every byte on the basis of the 4/15 modulation system which will be described later, and the modulated NRZ data are recorded in the area. In the case of a write-once type optical disk, recording is accompanied by a physical change such as formation of holes in a recording film. In the case of a rewritable disk utilizing a photomagnetic effect (hereinafter, referred to as a photomagnetic disk), recording is accompanied with no such physical change but is accompanied by a change such as inversion of the polarity of the magnetic field on the disk.

Each sector has 43 segments, and 42 segments of them have the data area, respectively. Each segment including the data area has 16 bytes so that each sector has (16 bytes×42 sectors=672 bytes) 672 bytes which are constituted by user's data, an error correcting code, and the like. Description as to the data area is not made in detail here.

Next, referring to FIG. 6, description will be made as to the 4/15 modulation system. In the 4/15 modulation system, one byte is converted into 15 channel bits, and marks are recorded on four portions (two odd numbered channel bit portions and two even numbered channel bit portions, except the fifteenth channel bit portion) of the 15 channel bit portions with one-to-one correspondency with the original 256 kinds of NRZ data in the conversion table. That is, for example, operation for formation of holes in a recording film is performed in the case of a write-one type optical disk, and operation for inversion of the direction of magnetization of a recording film is performed in the case of a photomagnetic disk. Although marks may be adjacent to each other (at the twelfth, thirteenth, and fourteenth channel bit positions) as shown in the example of FIG. 6, it must be selected that the interval between two marks (the ninth and twelfth channel bit positions) which are not adjacent to each other corresponds to 2 channel bits or more (the tenth and eleventh channel bits). Exceptionally, there occurs a case where marks are formed at the fourteenth channel bit position in a certain byte and at the first channel bit position in the next byte, and the interval between the two marks is formed only by one channel bit portion (the fifteenth channel bit). In this case, however, no mark is ever formed at the fifteenth channel bit position originally, and therefore the foregoing case does not give a harmful influence at the time of demodulation.

Next, description will be made as to demodulation of data in accordance with the 4/15 modulation system. FIG. 6 shows a reproduced waveform corresponding to the marks. In the case of performing recording by formation of holes, the intensity of the reflection light at a mark position is weaker than that at a no mark position (at a mirror surface). In media of the type of performing recording not by formation of holes, there are some cases in which changes occur in a manner opposite to the foregoing case. According to the 4/15 modulation system, however, demodulation can be performed so long as a level difference exists between the mark position and the mirror surface. It is therefore assumed that the reproduced waveform of FIG. 6 does not show the fact that the upper portion in the drawing is bright but merely shows a voltage level at a certain position in a demodulation circuit. In the case of a photomagnetic disk, the above-mentioned mirror surface level is replaced by an erase level. Demodulation can be performed so long as marks positioned at two odd numbered channel bits and two even numbered channel bits in the first to fourteenth channel bits in a certain byte can be identified. The mark positions can be identified, for example, if A/D conversion is performed at the bit center of the first to fourteenth channel bits and values of the obtained digital data are compared with each other. For example, in the example of FIG. 6, among the first, third, fifth, seventh, ninth, eleventh, and thirteenth channel bits, the thirteenth channel bit has the highest level, and the ninth channel bit has the second higher level. (In this example, the level of the fifteenth channel bit is sometimes higher than that of the ninth channel bit because the marks are formed at the fourteenth channel bit and the first channel bit of the next byte. No mark, however, is ever formed at the fifteenth channel bit position and therefore the level of the fifteenth channel bit is not made to be a subject for comparison. Accordingly, there occurs no harmful influence on demodulation). That is, it is understood that marks are formed at the ninth and thirteenth ones of the odd numbered channel bits, and, similarly, marks are formed at the twelfth and fourteenth ones of the even numbered channel bits. It is possible to demodulate the original NRZ data from the marks at the above-mentioned four positions by using the conversion table.

In short, in demodulation of the 4/15 modulation system, it is fundamental to compare the reproduction levels at the centers of the respective channel bits to each other.

FIG. 7 shows a recorded data demodulation circuit for demodulating data recorded on an optical disk as described above.

In FIG. 7, a so-called RF (high frequency) signal a which is a read signal produced from a pickup (not shown) is supplied to a demodulating clock generation circuit 1 and a transversal filter 2. The demodulating clock generation circuit 1 is configured to generate, as a demodulating clock ck, a clock of a predetermined frequency having a leading edge synchronized, for example, with a peak level point of the RF signal a.

In the transversal filter 2, the RF signal a is delayed by a predetermined time successively by means of analog delay elements 3 and 4 such as delay lines or the like, and the delayed RF signal is supplied to an addition/subtraction circuit 6 through an amplifier 5. Further, the RF signal and the output of the analog delay element 3 are supplied to the addition/subtraction circuit 6 through amplifiers 7 and 8, respectively. In the addition/subtraction circuit 6, a signal is obtained by subtracting the respective outputs of the amplifiers 5 and 7 from the output of the amplifier 8. The output of the addition/subtraction circuit 6 is supplied, as the output of the transversal filter 2, to an analog-to-digital (hereinafter, referred to as "A/D") conversion circuit 9.

In the A/D conversion circuit 9, the instantaneous level of the RF signal a is sampled, for example, in response to the leading edge of the demodulating clock ck, and digital data of n bits (n is a natural number) corresponding to the obtained sampling value are generated. The output data of the A/D conversion circuit 9 are supplied to a demodulation circuit 10 so as to be subject to demodulation processing, for example, in accordance with the 4/15 modulation system.

In the thus configured transversal filter 2, let the gain of each of the amplifiers 5 and 7 be represented by $K_1$, the gain of the amplifier 8 be represented by $K_0$, and the delay time of each of the analog delay elements 3 and 4 be represented by T. Then, the frequency characteristic $G(j\omega)$ of the transversal filter 2 is expressed by the following equation (1).

$$G(j\omega) = K_0 e^{-j\omega T} - K_1 (1 + e^{-2j\omega T}) \quad (1)$$
$$= e^{-j\omega T} \{K_0 - K_1 (e^{j\omega T} + e^{-j\omega T})\}$$
$$= e^{-j\omega T} (K_0 - 2K_1 \cos\omega T)$$

In the expression (1), $e^{-j\omega T}$ represents existence of a predetermined delay, and $(K_0 - 2K_1 \cos\omega T)$ represents the gain.

Therefore, the gain of the transversal filter 2 represented by a graph as shown in FIG. 8. By the transversal filter 2, the reduction in level of the components existing in a frequency band around a frequency of $\frac{1}{2}T$ is compensated to thereby perform waveform equalization, that is, waveform processing for shaping the waveform of the RF signal to be a waveform approximate to that of the original recorded signal. As a result, erroneous demodulation in the demodulation circuit 10 is prevented so that the error rate can be improved.

In the recorded data demodulation circuit as described above, however, there has been a disadvantage in that the equalization characteristics fluctuate because of scattering of the analog delay elements or scattering of the amplifier gains and there occurs a case where adjustment operation is required. Further, since it is necessary to change the gains of the amplifiers in the case where the equalization characteristics are to be changed, it has been difficult to improve the error rate by changing the equalization characteristics. Moreover, in the recorded data demodulation circuit, there has been a further disadvantage in that, since the analog delay elements are parts which are expensive and which are difficult to be constituted in the form of an IC, the demodulation circuit is high in manufacturing cost and is difficult to be constituted in the form of an IC.

SUMMARY OF THE INVENTION

The present invention has been attained in view of the foregoing points, and an object of the present invention is to provide a recorded data demodulation circuit in which no adjustment operation is required, in which an error rate can be improved easily, which can be constituted in the form of an IC easily, and which is low in manufacturing cost.

In the recorded data demodulation circuit according to the present invention, a clock of a predetermined frequency is generated on the basis of clock information contained in a read signal read from a recording medium. Sample values obtained by sampling the read signal in response to the clock are sequentially converted into digital data, and the thus obtained digital data are held in a first data holding means in response to the clock for a time corresponding to the period of the clock. The output data of the first data holding means are held in a second data holding means in response to the clock for a time corresponding to the period of the clock. The above-mentioned digital data and the output data of the second data holding means are added to each other, and then data corresponding to a difference between a value, obtained by multiplying at least either one of the data obtained by the above-mentioned addition by a predetermined value, and the output data of the first data holding means are generated, and the thus generated data are demodulated in response to the clock.

DETAILED DESCRIPTION OF THE PREFERRED EMBODIMENT

Figure 1:
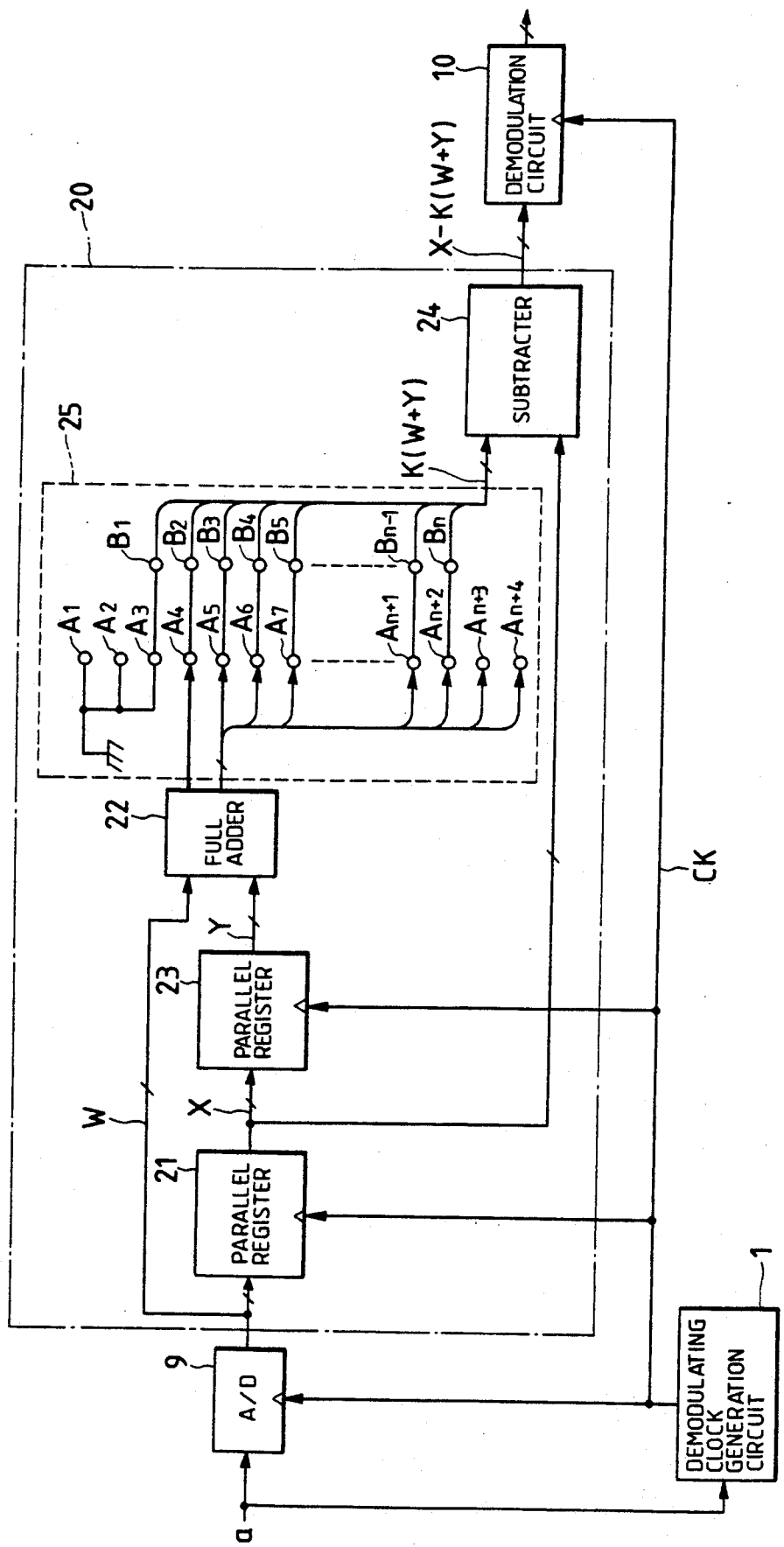
FIG. 1 is a block circuit diagram showing an embodiment of the present invention.
Figure 2:
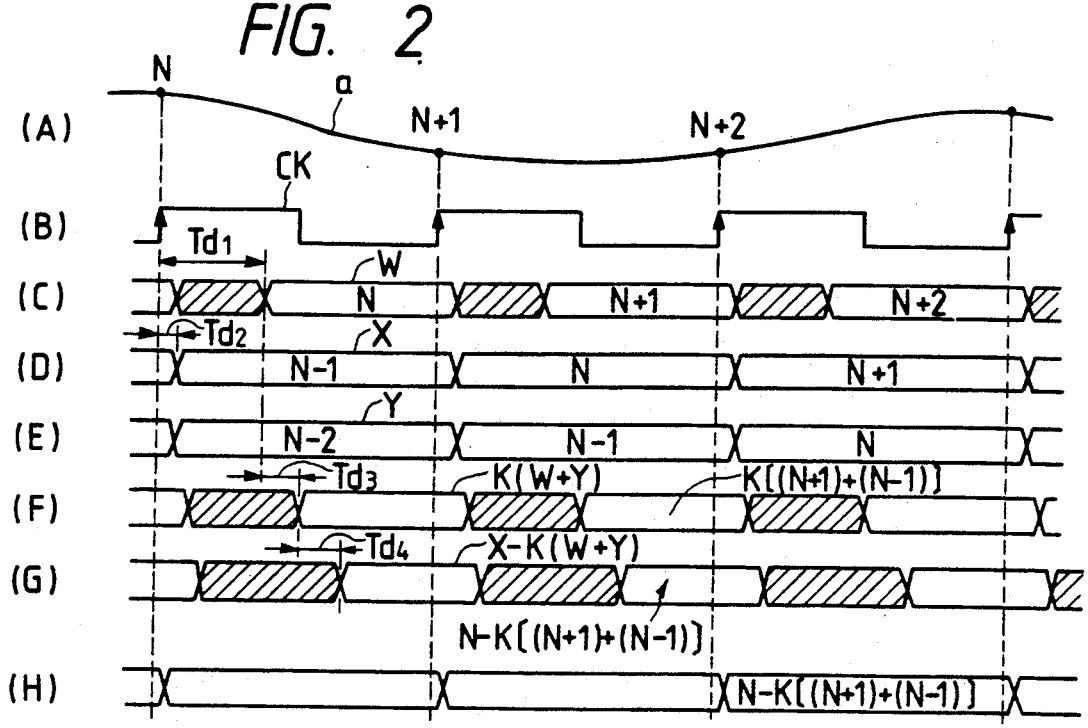
FIG. 2 is a timing chart showing the functions of the various portions of FIG. 1.
Figure 3:
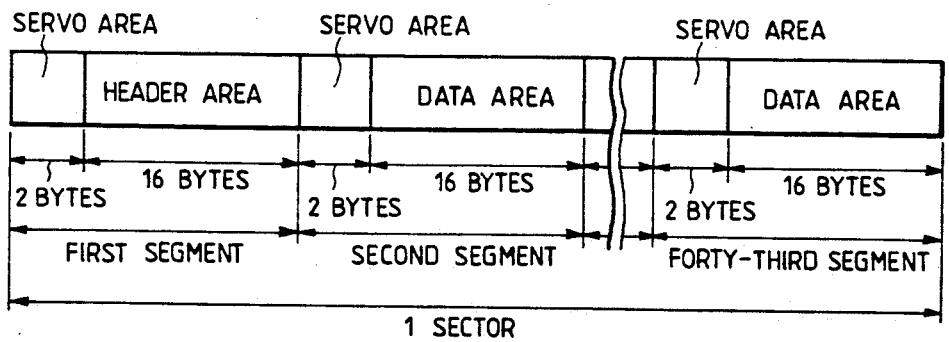
FIGS. 3 to 5 are diagrams showing an example of a recording format of a recording disk.
Figure 4:
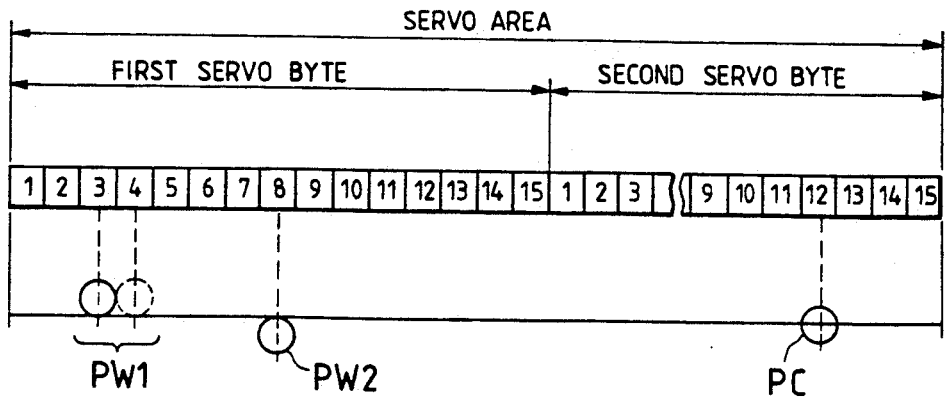
Figure 5:
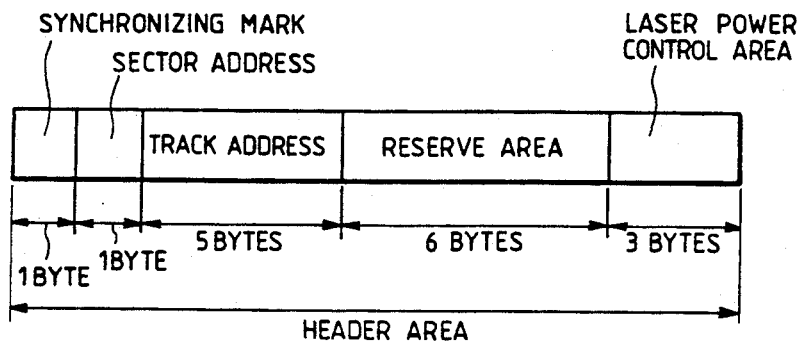
Figure 6:
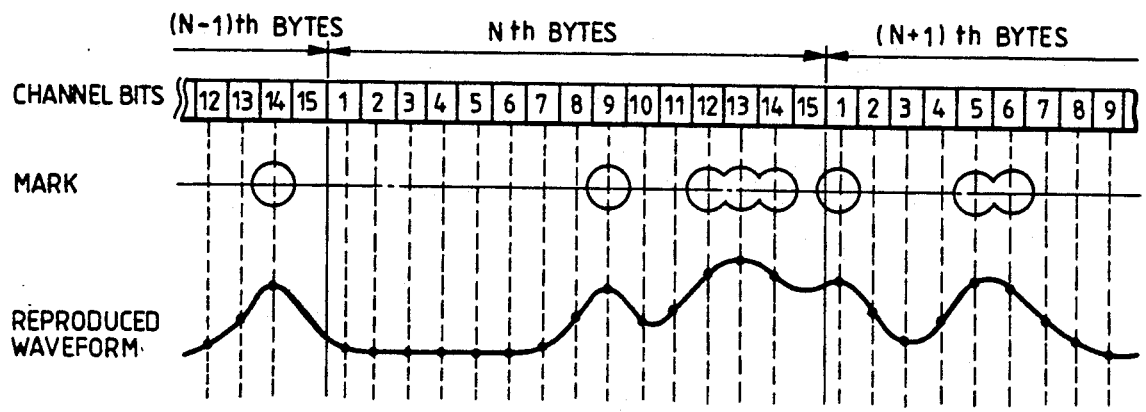
FIG. 6 is a diagram showing the correspondency between a recorded state of the data area and the waveform of a read signal.

Referring to FIGS. 1 and 2, embodiments of the present invention will be described in detail hereunder.

Figure 7:
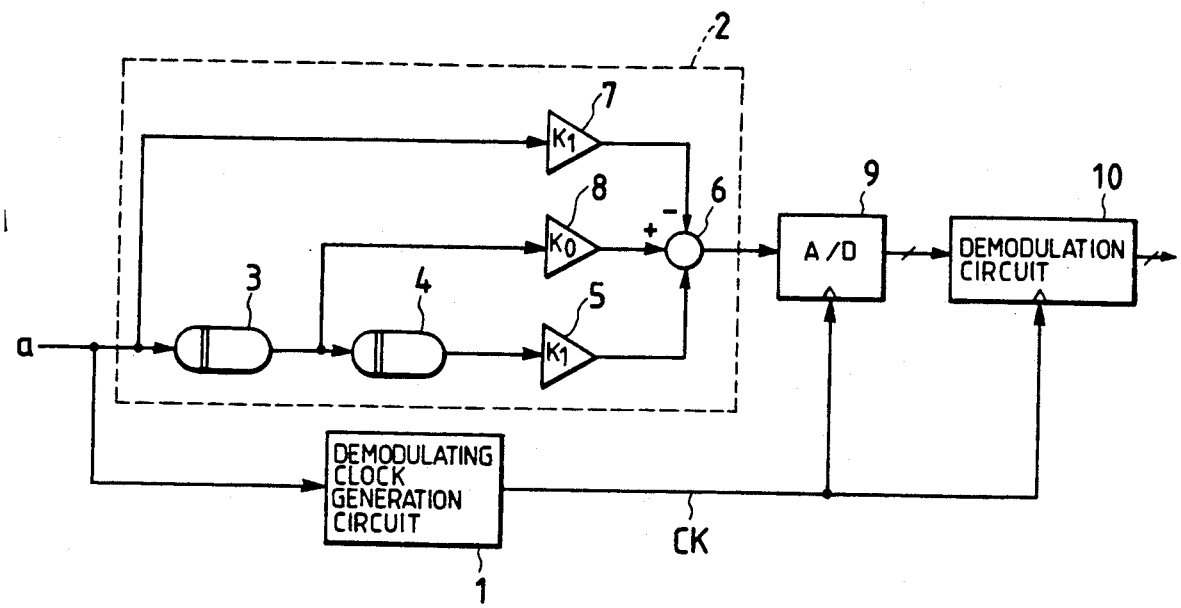
FIG. 7 is a block diagram showing a demodulation circuit.
Figure 8:
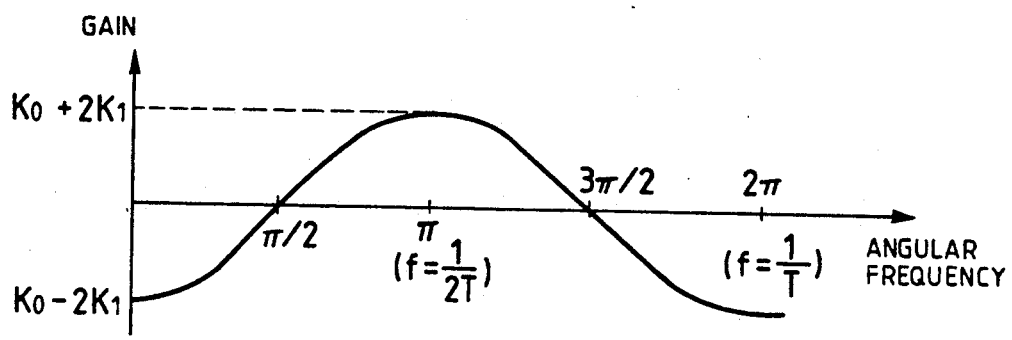
FIG. 8 is a graph showing the frequency characteristics of the transversal filter 2.

In FIG. 1, a demodulating clock generation circuit 1, and A/D conversion circuit 9, and a demodulation circuit 10 are connected to each other in the same manner as in the case of the circuit of FIG. 7. In this embodiment, however, data of n bits produced from the A/D conversion circuit 9 are supplied to the demodulation circuit 10 through a digital waveform equalization circuit 20.

In the digital waveform equalization circuit 20, the output data W of the A/D conversion circuit 9 are supplied to a parallel register 21 of n bits and a full adder 22 of n bits. A demodulating clock ck is supplied to the clock input terminal of the parallel register 21, and the output data W of the A/D conversion circuit 9 are held in the parallel register 21, for example, in response to the leading edge of the demodulating clock ck. The output data X of the parallel register 21 are supplied to a parallel register 23 of n bits and a subtracter 24. The demodulating clock ck is supplied to the clock input terminal of the parallel register 23, and the output data of the parallel register 23 are held, for example, in response to the leading edge of the demodulating clock ck. The output data Y of the parallel register 23 are supplied to the full adder 22 so as to be added to the output data W of the A/D conversion circuit 9. The output data of the full adder 22 are supplied to a constant multiplication circuit 25.

In the constant multiplication circuit 25, a carry bit and respective bits constituting the added output data of n bits produced from the full adder 22 are supplied to terminals $A_4$-$A_{n+4}$. Terminals $A_1$-$A_3$ aligned on one straight line together with the terminals $A_4$-$A_{n+4}$ are grounded. Respective terminals $B_1$-$B_n$ are disposed in opposition to the terminals $A_3$-$A_{n+2}$, the respective terminals $B_1$-$B_n$ are connected through connecting cables or the like to the terminals $A_1$-$A_n$, the terminals $A_2$-$A_{n+1}$, the terminals $A_3$-$A_{n+2}$, or the terminals $A_4$-$A_{n+3}$.

If the terminals $B_1$-$B_n$ are connected to the terminals $A_1$-$A_n$ respectively, data obtained by shifting the output data of the full adder 22 by four bits in the lower bit direction, that is, data obtained by multiplying the output data of the full adder 22 by 1/16, are derived from the terminals $B_1$-$B_n$. If the terminals $B_1$-$B_n$ are connected to the terminals $A_2$-$A_{n+1}$, respectively, data obtained by shifting the output data of the full adder 22 by three bits in the lower bit direction, that is, data obtained by multiplying the output data of the full adder 22 by ⅛, are derived from the terminals $B_1$-$B_n$. If the terminals $B_1$-$B_n$ are connected to the terminals $A_3$-$A_{n+2}$, respectively, data obtained by multiplying the output data of the full adder 22 by ¼ are derived from the terminals $B_1$-$B_n$. If the terminals $B_1$-$B_n$ are connected to the terminals $A_4$-$A_{n+3}$, respectively, data obtained by multiplying the output data of the full adder 22 by ½ are derived from the terminals $A_4$-$A_{n+3}$.

The data derived from the terminals $B_1$-$B_n$ are supplied, as the output data of the constant multiplication circuit 25, to the subtracter 24.

In the subtracter 24, the output data of the constant multiplication circuit 25 are subtracted from the output data X of the parallel register 21. The output data of the subtracter 24 are supplied, as the output data of the digital waveform equalization circuit 20, to the demodulation circuit 10.

In this configuration, when an RF signal a as shown in the diagram (A) of FIG. 2 is supplied to the A/D conversion circuit 9, a demodulating clock ck as shown in the diagram (B) of FIG. 2 is produced from the demodulating clock generation circuit 1. In the A/D conversion circuit 9, the RF signal a is sampled in response to the leading edge of the demodulating clock ck, and the instantaneous levels at the points N, (N+1), and (N+2) of the RF signal a corresponding to the leading edge of the demodulating clock ck are taken as sampling values. Thereafter, digital data corresponding to the instantaneous levels at the points N, (N+1), and (N+2) of the RF signal a are produced from the A/D conversion circuit 9 with a time delay $TD_1$ corresponding to the signal delay time in the A/D conversion circuit 9 from the leading edge of the demodulating clock ck a shown in the diagram (C) of FIG. 2.

The output data W of the A/D conversion circuit 9 are held in the parallel register 21 in response to the leading edge of the demodulating clock ck. Since the data corresponding to the instantaneous level of the RF signal a are produced from the A/D conversion circuit 9 with the time delay $Td_1$ from the leading edge of the demodulating clock ck as described above, data corresponding to the instantaneous level of the RF signal a before one clock period, that is, at a point of time before a time corresponding to the period of the demodulating clock ck, are held in the parallel register 21 as shown in the diagram (D) of FIG. 2.

The output data X of the parallel register 21 are held in the parallel register 23 in response to the leading edge of the demodulating clock ck. Since a signal delay time $Td_2$ exists also in the parallel register 21, data corresponding to the instantaneous level of the RF signal a before two clocks, that is, at a point of time before a time corresponding to a value twice as long as the period of the demodulating clock ck, are held in the parallel register 23 as shown in the diagram (E) of FIG. 2. Therefore, the parallel registers 21 and 23 function as delay elements each for delaying an input by one clock period.

The output data Y of the parallel register 23 are supplied to the full adder 22 so as to be added to the data W, and the sum is supplied to the constant multiplication circuit 25 so as to be multiplied by the constant K. Then, the thus obtained data K(W+Y) are outputted with a time delay $Td_3$ corresponding to the signal delay time, in the full adder 22, from the data W as shown in the diagram (F) of FIG. 2.

The output data K(W+Y) of the constant multiplication circuit 25 are supplied to the subtracter 24 so that the data K(W+Y) are subtracted from the data X, and the thus obtained data [X-K(W+Y)] are outputted with a time delay $Td_4$ corresponding to the signal delay time, in the subtracter 24, from the data K(W+Y) as shown in the diagram (G) of FIG. 2.

The output data [X-K(W+Y)] of the subtracter 24 are supplied to the demodulation circuit 10. As a result, in the demodulation circuit 10, data as shown in the diagram (H) of FIG. 2 are held and demodulated on the basis of the demodulating clock ck.

In the foregoing operation, the parallel registers 21 and 23 function as delay elements each for delaying an input by one clock period so that the digital waveform equalization circuit 20 functions as an equivalent circuit of the transversal filter 2 in the circuit of FIG. 7. Therefore, erroneous demodulation in the demodulation circuit 10 is prevented and the error rate can be improved.

Further, waveform equalization processing is performed on the basis of the demodulating clock ck having a frequency lower than an upper limit of the frequency band of the RF signal in the digital waveform equalization circuit 20. In the demodulation circuit 10, however, demodulation is performed by holding only the data upon occurrence of a leading edge of the demodulating clock ck. Accordingly, it will do to perform the waveform equalization only on the data upon occurrence of a leading edge of the demodulating clock ck, and, therefore, no problem is caused. Taking the frequency characteristic G(jω) into consideration, the following equations are obtained from the equation (1).

$G\pi = K_0 + 2K_1$ $G_{DC} = K_0 - 2K_1$

Accordingly, the rising rate P of the gain is expressed by the following equation (2).

$$P = G\pi/G_{DC} = \frac{K_0 + 2K_1}{K_0 - 2K_1} \quad (2)$$

In the case where the value of the multiplier K by which the output data of the full adder 22 is to be multiplied in the constant multiplication circuit 25 is 1/16, $K_0=1$ and $K_1=1/16$ are substituted in the equation (2) so that the value of the gain rising rate of the digital waveform equalization circuit 20, 9/7 ($\approx$2.2 dB), is obtained. Similarly to this, when the value of the multiplier K is ⅛, the gain rising rate of the digital waveform equalization circuit 20 is 4.4 dB. Further, when the value of the multiplier K is ¼, the gain rising rate of the digital waveform equalization circuit 20 is 9.5 dB. Moreover, when the value of the multiplier K is ½, the gate rising rate of the digital waveform equalization circuit 20 is ∞.

Thus, although the equalization characteristic is changed in accordance with the value of the multiplier K, the alteration of the value of the multiplier K can be performed by changing only the connection between the terminals $A_1$-$A_{n+4}$ and the terminals $B_1$-$B_n$, and therefore the alteration of the equalization characteristic can be easily performed.

As described above in detail, in the recorded data demodulation circuit according to the present invention, a clock of a predetermined frequency is generated on the basis of clock information contained in a read signal read from a recording medium. Sample values obtained by sampling the read signal in response to the clock are sequentially converted into digital data, and the thus obtained digital data are held in a first data holding means in response to the clock for a time corresponding to the period of the clock. The output data of the first data holding means are held in a second data holding means in response to the clock for a time corresponding to the period of the clock, and the above-mentioned digital data and the output data of the second data holding means are added to each other. Data corresponding to a difference between a value, obtained by multiplying at least either one of the data obtained by the above-mentioned addition by a predetermined value, and the output data of the first data holding means are generated, and the thus generated data are demodulated in response to the clock.

In the recorded data demodulation circuit according to the present invention, therefore, digital data corresponding to the read signal are delayed by the first and second data holding means, and the delayed data are subject to waveform equalization processing, so that it is not necessary to use analog delay elements. Consequently, fluctuations of the equalization characteristic due to scattering of the analog delay elements can be prevented, and it is not necessary to perform an adjustment operation. Further, when at least either one of the added data and the output data of the first data holding means is multiplied by a predetermined value, suffice it to merely make connection of the transmission line for the above-mentioned one data so that the data are shifted by the number of bits corresponding to the predetermined value. Therefore, it is possible to perform alteration of the equalization characteristic only by changing the connection of the transmission line for the above-mentioned one data, so that an improvement of the error rate by changing of the equalization characteristic can be easily performed. Further, since no analog delay elements are required, the recorded data demodulation circuit can be realized in the form of an IC easily and the producing cost thereof can be decreased.

What is claimed is:

1. A recorded data demodulation circuit comprising:
clock generation means for generating a clock of a predetermined frequency on the basis of clock information in a read signal read from a recording medium;
analog-to-digital conversion means for successively converging sampled values obtained by sampling said read signal into digital data in response to said clock;
first data holding means for holding the output digital data of said analog-to-digital conversion means in response to said clock for a time corresponding to a period of said clock, and for outputting said output data after said holding;
second data holding means for holding the output data of said first data holding means in response to said clock for a time corresponding to the period of said clock, and for outputting said output data after said holding;
addition means for adding the output data of said analog-to-digital conversion means and the output data output from said second data holding means;
multiplying means for obtaining a multiplied value by multiplying at least one of the output data of said addition means by a predetermined value;
data generation means for generating data corresponding to a difference between said multiplied value and the output data of said first data holding means; and
demodulating processing means for demodulating the output data of said data generation means in response to said clock.

2. A recorded data demodulation circuit comprising:
clock generation means for generating a clock of a predetermined frequency on the basis of clock information in a read signal read from a recording medium;
analog-to-digital conversion means for successively converting sampled values obtained by sampling said read signal into digital data in response to said clock;
first data holding means for holding the output digital data of said analog-to-digital conversion means in response to said clock for a time corresponding to a period of said clock, and for outputting said output data after said holding;
second data holding means for holding the output data of said first data holding means in response to said clock for a time corresponding to the period of said clock, and for outputting said output data after said holding;
addition means for adding the output data of said analog-to-digital conversion means and the output data output from said second data holding means;
multiplying means for obtaining a multiplied value by multiplying at least one of the output data of said addition means by a predetermined value;
data generation means for generating data corresponding to a difference between said multiplied value and the output data of said first data holding means; and
demodulating processing means for demodulating the output data of said data generation means in response to said clock; wherein said multiplying means includes:
a plurality of first terminals having a first subset of said first terminals supplied with a predetermined number of addition output bits from said addition means for forming lower significant bit output data, and having a second subset of said first terminals supplied with a predetermined number of zero bits with bit values of "0", said zero bits being associated with said predetermined number of addition output bits so as to form upper significant bit output data; and
a plurality of second terminals arranged so as to be selectively connectable to any of said first terminals, to include any predetermined number of said zero bits as upper significant bits so as to effect multiplication by a shifting of said addition output bits by said predetermined number of zero bits, wherein data derived from said second terminals are made to be the data obtained by mulitplying said output data of said addition means by said predetermined value.

* * * * *